(12) United States Patent
Chascsa, II et al.

(10) Patent No.: US 10,182,469 B2
(45) Date of Patent: Jan. 15, 2019

(54) STEERING WHEEL HEATING SYSTEM

(71) Applicant: FORD GLOBAL TECHNOLOGIES, LLC, Dearborn, MI (US)

(72) Inventors: James Robert Chascsa, II, Novi, MI (US); Ishak Zaman, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 277 days.

(21) Appl. No.: 14/487,350

(22) Filed: Sep. 16, 2014

(65) Prior Publication Data

US 2016/0075365 A1   Mar. 17, 2016

(51) Int. Cl.
*B62D 1/06* (2006.01)
*H05B 1/02* (2006.01)
*B60R 16/03* (2006.01)

(52) U.S. Cl.
CPC ........... *H05B 1/0236* (2013.01); *B60R 16/03* (2013.01); *B62D 1/065* (2013.01)

(58) Field of Classification Search
CPC ........ B62D 1/065; H05B 3/84; H05B 1/0236; H05B 2203/035
USPC ................ 219/201, 202, 204, 209, 494, 543
See application file for complete search history.

(56) References Cited

U.S. PATENT DOCUMENTS

| | | | | |
|---|---|---|---|---|
| 4,730,097 A * | 3/1988 | Campbell | ............... | B60S 1/026 219/203 |
| 6,093,908 A * | 7/2000 | Haag | ...................... | B62D 1/065 219/204 |
| 6,268,588 B1 * | 7/2001 | Hazebrouck | .......... | B62D 1/065 219/204 |
| 6,664,517 B2 | 12/2003 | Nagatomo | | |
| 2012/0234816 A1 * | 9/2012 | Petrenko | .................. | H05B 3/84 219/203 |
| 2014/0110388 A1 | 4/2014 | Fassbender et al. | | |

FOREIGN PATENT DOCUMENTS

| | | |
|---|---|---|
| CN | 2625237 Y | 7/2014 |
| CN | 203727454 U | 7/2014 |
| JP | S60112429 A | 6/1985 |
| JP | 2005297704 A | 10/2005 |

OTHER PUBLICATIONS

"Electrical resistance and conductance", downloaded on Jul. 7, 2016 from https://en.wikipedia.org/wiki/Electrical_resistance_andconductance.*
"American wire gauge", downloaded on Jul. 7, 2016 from https:en.wikipedia.org/wiki/American_wire_gauge.*

* cited by examiner

*Primary Examiner* — Thien S Tran
(74) *Attorney, Agent, or Firm* — Frank MacKenzie; Brooks Kushman, P.C.

(57) ABSTRACT

A heating system for a vehicle steering wheel may include a conductive element surrounding at least a portion of the steering wheel, a power supply for the conductive element configured to provide an input voltage, and a transformer between the power supply and the conductive element and configured to receive the input voltage and provide an output voltage higher than the input voltage to the conductive element for heating the steering wheel.

18 Claims, 4 Drawing Sheets

STEERING WHEEL HEATING SYSTEM

TECHNICAL FIELD

Disclosed herein is a steering wheel heating system.

BACKGROUND

Cold weather may cause steering wheels within vehicles to become cold and uncomfortable for drivers. While a cabin of the vehicle may be heated using a vehicle climate control system, the steering wheel may take longer to heat up, causing an unpleasant experience for the driver. Steering wheels may include conductive resistive meshes configured to heat the steering wheel when voltage is applied. However, existing systems may result in slow heat times as a result of low voltages supplied to the resistive mesh.

SUMMARY

A heating system for a vehicle steering wheel may include a conductive element surrounding at least a portion of the steering wheel, a power supply configured to provide an input voltage, and a transformer connected between the power supply and the conductive element and configured to receive the input voltage and provide an increased output voltage to the conductive element for heating the steering wheel.

A heating system for a vehicle steering wheel may include a resistive mesh configured to surround at least a portion of the steering wheel and a step-up transformer coupled between a power supply and the resistive mesh and configured to receive an input voltage from the power supply and provide an output voltage exceeding the input voltage to the resistive mesh for heating the steering wheel.

A heating system for a vehicle steering wheel may include a conductive element configured to surround at least a portion of the steering wheel, a power supply coupled to the conductive element and configured to provide an input voltage, a transformer coupled between the power supply and the conductive element, a switching element configured to couple the power supply to one of the transformer and the conductive element, and a controller coupled to the switching element and programmed to receive at least one temperature from a temperature sensor of a steering wheel, and instruct the switching element to maintain or change position based on the temperature.

BRIEF DESCRIPTION OF THE DRAWINGS

Representative embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a steering wheel heating system configured to decrease the length of time required to reach a desired temperature of the steering wheel. In one example, a step-up transformer is included in the heating system to increase the voltage relative to the vehicle battery voltage, which is selectively applied to a heat mesh on the steering wheel. By increasing the voltage and resulting current, the steering wheel may be heated in a shorter amount of time.

Figure 1:
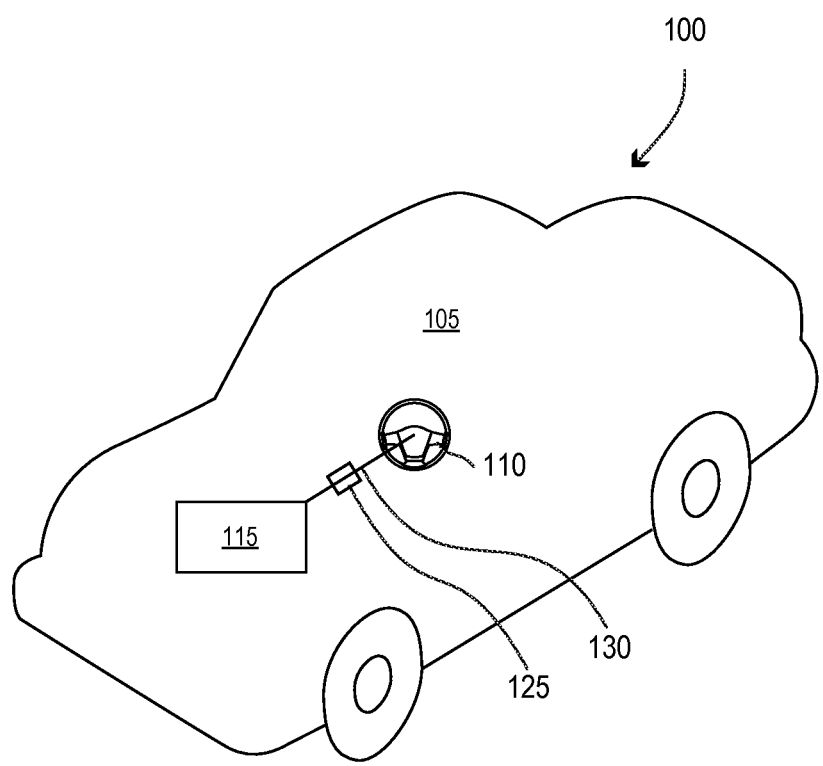
FIG. 1 illustrates a steering wheel heating system for a vehicle.
Figure 2:
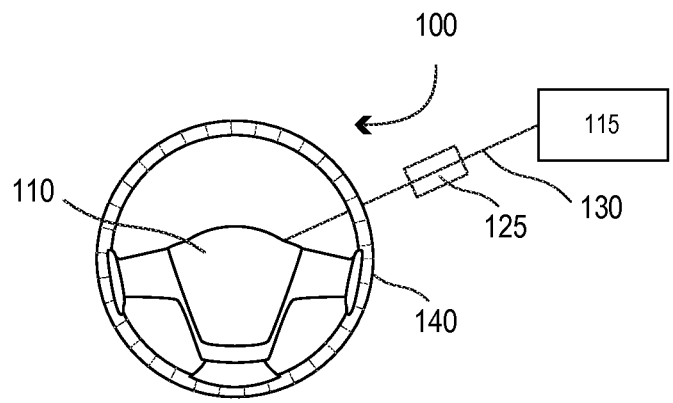
FIG. 2 further illustrates the steering wheel heating system of FIG. 1.
Figure 3:
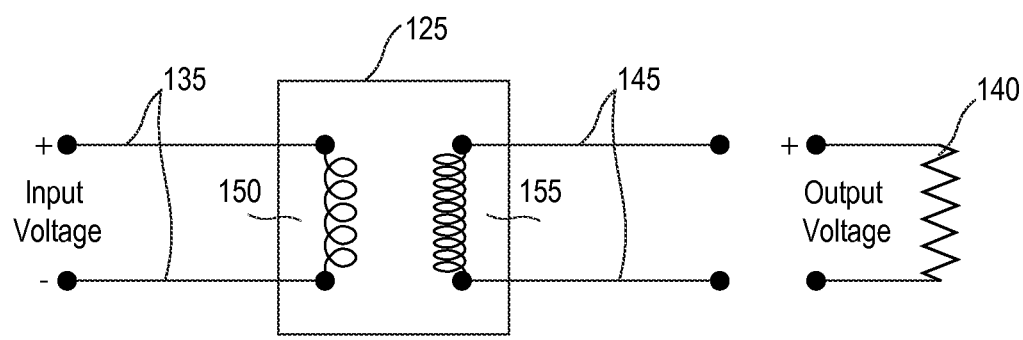
FIG. 3 illustrates a schematic of the steering wheel heating system.

FIGS. 1-4 illustrate a steering wheel heating system 100 for a vehicle 105. The system 100 may include a steering wheel 110, a vehicle power supply 115 (also referred to as battery 115) and a transformer 125, connected by a wire 130, or a plurality of wires. The battery 115 may store energy that may be used by the electric motors of the vehicle (not shown). The battery 115 may also be used by other vehicle systems including the heating system 100. In a typical vehicle, the battery 115 may be, for example, a 12V or 14V battery. The wires 130 may extend from the positive and negative terminals of the battery 115 (as shown in FIG. 2) to connect to the transformer 125 and the steering wheel 110. The wires 130 may extend through a steering shaft/column and be coupled to a conductive material (shown in FIG. 2) extending around the steering wheel 110. As an example, each wire 130 may be a 22 gauge copper wire. The wires 130 may include a plurality of wires for transmitting voltage to the conductive element 140. For example, the wires may include a first, or input, wire 135 extending from the battery 115 to the transformer 125 and a second, or output, wire 145 extending from the transformer 125 to the conductive element 140 (as shown in FIG. 3). Because the first wire 135 and the second wire 145 may apply different voltages and carry different currents, the first wire 135 and second wire 145 may be of different gauges and different lengths, depending on the voltage, current, and voltage drop of the wire. For example, the second wire 145 may smaller (have a higher gauge) and be shorter than the first wire 135. While the first wire 135 may be a 22 gauge copper wire, the second wire 145 may depend on the maximum current that the second wire 145 may be designed to carry. For example, the second wire 145 may be an 18 gauge copper wire.

The transformer 125 may be arranged between the battery 115 and the steering wheel 110 to increase the voltage supplied by the battery (e.g. 14V) to the steering wheel 110. The transformer 125 may be arranged within the steering shaft/column.

The transformer 125 may be a step-up transformer and is described in greater detail with respect to FIG. 3. Generally, step-up transformers have two winding sets, with the primary side winding set having fewer turns than the secondary side of the transformer 125. The ratio of the number of windings of the first set to the second set may be known as a turn ratio. The ratio may vary depending on the desired output voltage relative to the input voltage. In one example, the ratio may be approximately 1:2 to increase an input vehicle battery voltage of 14V to an output voltage of 28V applied to the conductive element 140, for example. In another example, the ratio may be 4:5, to increase an input voltage of 12V to an output voltage of 15V, for example.

Referring to FIG. 2, the steering wheel 110 may include an inner frame and an outer frame (not shown). The outer frame may include padding and an outer surface (not shown). The outer surface may be the portion exposed to the driver's hands and may be a comfortable material such as leather, nylon, etc. The padding underneath the outer surface may increase the comfort of the wheel 110 to the user. The steering wheel 110 may include a conductive element 140 arranged between the outer surface and the padding, although other configurations are possible and are within the scope of this disclosure. The conductive element 140 may be a wire mesh having resistive properties. The mesh may be made of copper or other conductive material. The material may create a woven pattern and may be flexible so as to wrap around the steering wheel 110. The conductive element 140 may expand around nearly the entire steering wheel 110 substantially covering all sides and surfaces of the wheel 110. In other configurations, the conductive element 140 may extend around a portion of the wheel 110.

FIG. 3 illustrates a schematic of the heating system 100. An input voltage may be supplied by the battery 115 (illustrated in FIG. 2). In one example, the input voltage may be approximately 13.5V and may be provided to the transformer 125 via the first wires 135.

The transformer 125, as explained, may be arranged between the battery 115 and the steering wheel 110. The transformer 125 may be a step-up transformer having a primary side 150 (input side) and a secondary side 155 (output side). Each side may include a plurality of windings. The number of windings on the primary side 150 of the transformer 125 is less than the number of windings on the secondary side 155. The exact ratio depends on the desired output voltage. In the example herein, a desired output voltage may be approximately 16.875V. If the input voltage is approximately 13.5V, then for every 4 windings on the primary side 150, there must be 5 windings on the secondary side 155 (a 4:5 ratio).

While the voltage may increase at the secondary side 155, the power at each the primary side 150 and the secondary side 155 may remain the same. Since the power is the product of the current and the voltage, the current at the secondary side 155 may be less than the current at the primary side 150. However, the current supplied to the conductive element 140 of the disclosed system 100 may still exceed current supplied to a resistive mesh of a system without an intervening transformer. For example, if the input voltage of a system without a transformer is approximately 13.5V, and the resistance of the conductive element 140 is approximately 1.6875 Ohms, the current supplied to the conductive element 140 may be approximately 8.0 Amps. However, a system having the transformer 125 supplying a stepped-up voltage of approximately 16.875V to the conductive element 140 may supply a current of approximately 10.0 Amps. Accordingly, the current supplied to the conductive element 140 is higher than that of a system without a transformer.

As shown in FIG. 3, the output voltage may be provided to the steering wheel conductive element 140 via the second wires 145. The second wires 145 may connect to the secondary side 155 of the transformer 125 and be coupled through the transformer 125 to the battery 115. The second wires 145 may be (gauge) than the first wires 135 at least because a larger voltage and corresponding current is transmitted therein. Although not shown, a second circuit may be provided to supply the increased current. Further, depending on the size of the second wires 145, the location of the transformer 125 relative to the steering wheel 110 may be adjusted. If a larger wire, for example, a 10 gauge wire, is used for the second wires 145, then the transformer 125 may be arranged closer to the steering wheel 110 so that the length of the larger wire is kept to a minimum. Similarly, if the second wires 145 are smaller, such as a 24 gauge wire, then the transformer 125 may be arranged closer to the battery 115. The size of the wire may also depend on the available space within the steering shaft.

Figure 4:
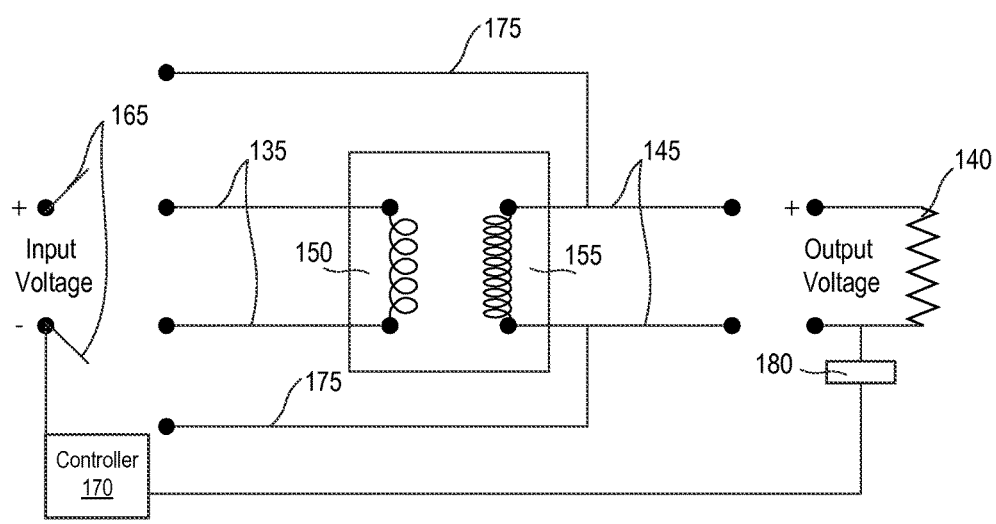
FIG. 4 illustrates another schematic of the steering wheel heating system.

FIG. 4 illustrates another schematic of the heating system 100. In this example, a switching element 165 and a controller 170 are included in the system 100. The switching element 165 may electronically couple to both the first wires 135 and third wires 175. The third wires 175 may include a wire pair that is configured to circumvent the transformer 125 and provide voltage directly from the battery 115 to the conductive element 140. This may be necessary where the resistive element 140 may have sufficiently warmed the steering wheel 110 and the larger voltage created by the transformer 125 may not be necessary. For example, upon vehicle start up, the steering wheel may be very cool at least because the ambient air surrounding it is very cool. It may be desirable for the steering wheel 110 to quickly heat-up in an effort to increase user comfort and satisfaction. However, as time passes, the steering wheel 110 heats up, as does the ambient air (e.g., the air in the cabin of the vehicle 105.) At some point, the steering wheel may not need to be heated further, or the steering wheel 110 may not need to be heated as fast. In this situation, the additional voltage from the transformer 125 may be unnecessary.

In one example, the third wires 175 may each be a 22 gauge copper wire. In the example of FIG. 4, the second wires 145 may be required to handle two different currents, a first current when the switching element 165 is in the first position and voltage is increased by the transformer, and a second current when the switching element 165 is in the second position and voltage is supplied directly from the battery 115. Thus, the second wire 145 may be of a size that accommodates both current possibilities.

The switching element 165 may be an electronic switch configured to connect the battery 115 to either the transformer 125 or the conductive element 140. The switching element 165 may include a double pole, single throw switch. The switching element 165 may also include two single pole switches (each connecting to one of the third wires 175). The switching element 165 may also include a single pole or double pole, triple throw switch, where the switch may achieve one of three positions including a center OFF position.

The system 100 may include a temperature sensor 180. The temperature sensor 180 may be included in the steering wheel 110 and may sense the temperature of the steering wheel 110. The sensor 180 may be in communication with the controller 170 and may transmit the steering wheel temperature to the controller 170.

The controller 170 may include a processor and a memory for processing data related to the heating system 100. The controller 170 may be a separate controller for operating the heating system 100. Additionally or alternatively, the controller 170 may be another vehicle controller such as another control module configured to manage and control other vehicle systems such as power electronics, heating and cooling systems, energy control, etc. The controller 170 may control the switching element 165 based on the temperature transmitted by the temperature sensor 180. For example, the switching element 165 may default to a first position where the switches connect the battery 115 to the first wires 135. This may permit the steering wheel 110 to receive the higher voltage provided by the transformer 125 at vehicle start up. Once the steering wheel 110 is heated to a desirable temperature, the controller 170 may instruct the switching element 165 to switch to a second position where the battery 115 is connected to the third wires 175. In this arrangement, the voltage from the battery 115 is unaffected by the transformer 125. The resistive/conductive element 140 may receive this voltage and may maintain the temperature at the steering wheel 110. The controller 170 may further instruct the switching element 165 to switch to a third position where neither the first nor third wires 135, 175 are connected to the battery 115, and thus no voltage is transmitted to the conductive element 140. This may be necessary when the steering wheel 110 is in danger of becoming to other vehicle is turned off, or when battery energy must be reserved for other vehicle systems.

Figure 5:
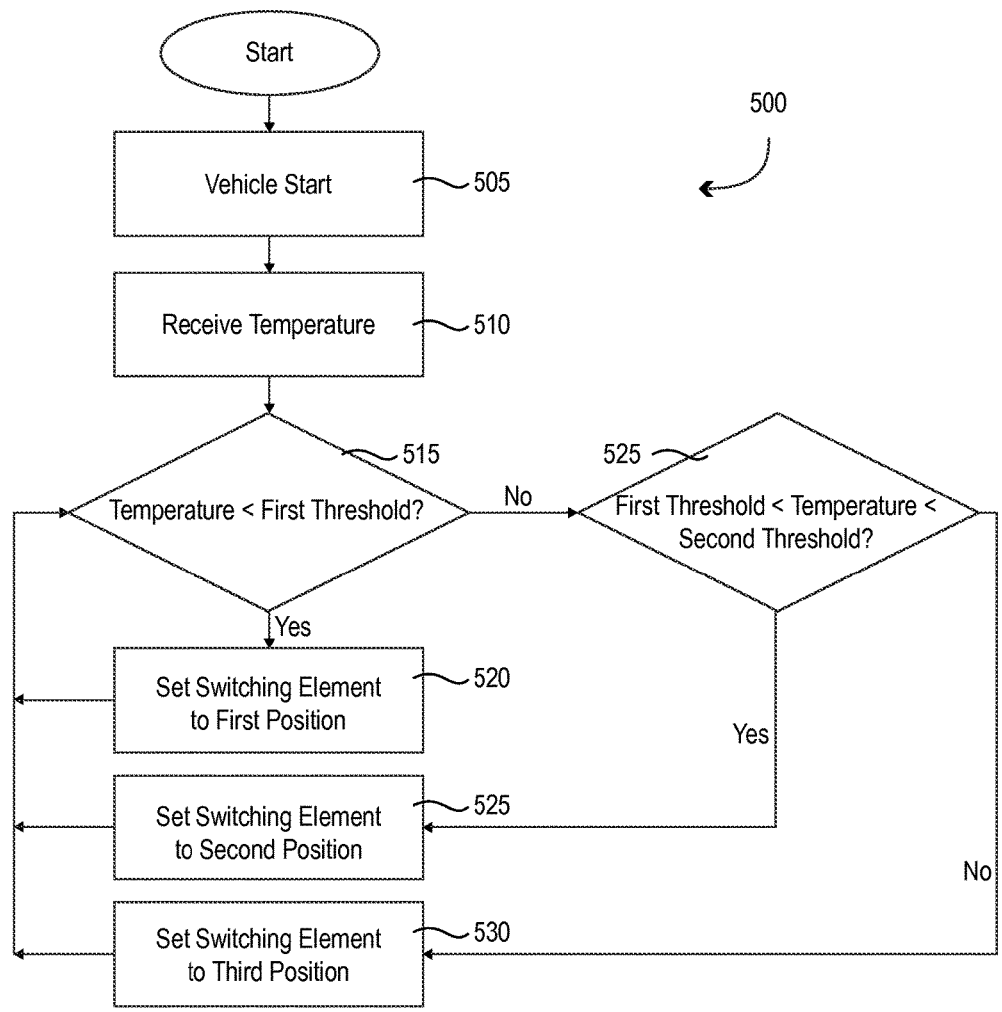
FIG. 5 illustrates a flow chart for the steering wheel heating system.

FIG. 5 illustrates a flow chart for the heating system 100. Process 500 begins at block 505 when the vehicle starts. At block 510, the controller 170 may receive a steering wheel temperature from the sensor 180. The sensor 180 may continually provide temperature readings to the controller 170. Additionally or alternatively, the controller 170 may query the sensor 180 for a temperature reading.

At block 515, the controller 170 may determine whether the received temperature is below a first threshold. The first threshold may be a predefined temperature value indicative of a very cold steering wheel 110. For example the first threshold may be a temperature that causes the steering wheel 110 to be uncomfortable to grasp. In one example, the first threshold may be approximately 50 degrees Fahrenheit. If the received temperature is below the first threshold, the process 500 proceeds to block 520. If not the process proceeds to block 525.

At block 520, if the received temperature indicates that the steering wheel 110 is below the first threshold, the controller 170 may instruct the switching element 165 to move to the first position, thus connecting the battery 115 to the transformer 125 so that the conducting element 140 within the steering wheel 110 may receive the higher voltage generated by the transformer 125 and thus heat the conductive element 140 faster. After the switching element 165 has been set to the first position, the process 500 may return to block 515.

At block 525, the controller 170 may determine whether the received temperature is between the first threshold and a second threshold. The second threshold may be a predefined temperature value indicative of a cold steering wheel 110. That is, while the second threshold may indicate that the steering wheel 110 is cold and should be heated, the second threshold may be a higher temperature than the first threshold. For example, the second threshold may be approximately 60 degrees Fahrenheit. If the received temperature is within the first and second thresholds (e.g., between 50 and 60 degrees Fahrenheit), the process 500 proceeds to block 530. If not, the process proceeds to block 535.

At block 530, the controller 170 may instruct the switching element 165 to move to the second position, thus connecting the battery 115 to the conducting element 140 and circumventing the transformer 125 so that the conductive element 140 receives battery voltage to heat the steering wheel 110. After the switching element 165 has been set to the second position, the process 500 may return to block 515.

At block 535, the controller 170 may determine that the received temperature is above the second threshold. In this situation, the steering wheel 110 may be of a comfortable temperature, and no heating thereof may be necessary. The controller 170 may instruct the switching element 165 to move to the third position, thus disconnecting the conducting element 140 from the battery 115 and cutting off the voltage supply. The process 500 may return to block 515 to ensure that the temperature of the steering wheel 110 remains at a comfortable level for the driver.

The process 500 may continue to analyze the temperature values against the various thresholds until the vehicle turns off. The process 500 may also end if battery energy is required by other vehicle systems, or if the heating system 100 is manually turned off, for example, by the driver by selecting an input in a display of the vehicle 105.

Accordingly, described herein is a steering wheel heating system that uses a step-up transformer to increase the voltage transmitted to the heat mesh of a steering wheel to increase the speed at which the steering wheel is heated. The system may be easily configured with existing batteries and vehicle systems without putting additional draw on the battery itself.

Computing devices described herein such as controller 170 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A heating system for a vehicle steering wheel comprising:

a conductive element surrounding a portion of a steering wheel;

a power supply configured to provide an input voltage;

a transformer connected with the power supply via a first wire and the conductive element via a second wire, a switching element configured to selectively couple the power supply to one of the transformer and the conductive element.

2. The system of claim 1, further comprising:

a temperature sensor coupled to the conductive element and configured to sense the temperature of the steering wheel; and a controller coupled to the temperature sensor and the switching element, the transformer configured to provide an output voltage higher than the input voltage to the conductive element, the second wire configured to carry a larger current than the first wire.

3. The system of claim 2, wherein the controller is programmed to instruct the switching element to couple the power supply to the transformer in response to receiving a temperature from the temperature sensor being below a first threshold.

4. The system of claim 2, wherein the controller is programmed to instruct the switching element to couple the power supply to the conductive element in response to receiving a temperature from the temperature sensor being within a predefined temperature range.

5. The system of claim 2, wherein the controller is programmed to instruct the switching element to disconnect the power supply from the conductive element in response to the temperature from the temperature sensor being above a second threshold.

6. A heating system for a vehicle steering wheel comprising:

a resistive mesh configured to surround at least a portion of the steering wheel and;

a step-up transformer coupled between a power supply and the resistive mesh and configured to receive an input voltage from the power supply and provide an output voltage exceeding the input voltage to the resistive mesh for heating the steering wheel; and a switching element configured to electronically couple the power supply to one of the transformer and the resistive mesh.

7. The system of claim 6, wherein the transformer is coupled to the power supply via a first wire and wherein the transformer is coupled to the resistive mesh via a second wire, the first wire being configured to carry a larger current than the second wire.

8. The system of claim 6, wherein the resistive mesh includes a plurality of copper wires configured to transmit current supplied by the transformer.

9. The system of claim 6, further comprising:

a temperature sensor coupled to the resistive mesh and configured to sense the temperature of the steering wheel; and a controller coupled to the temperature sensor.

10. The system of claim 9, wherein the controller is programmed to instruct the switching element based on the temperature received from the temperature sensor.

11. The system of claim 10, wherein the controller is programmed to instruct the switching element to couple the power supply to the transformer in response to receiving a temperature from the temperature sensor being below a first threshold.

12. The system of claim 10, wherein the controller is programmed to instruct the switching element to couple the power supply to the resistive mesh in response to receiving a temperature from the temperature sensor being within a predefined temperature range.

13. A heating system for a vehicle steering wheel comprising:

a conductive element configured to surround at least a portion of the steering wheel;

a power supply coupled to the conductive element and configured to provide an input voltage;

a transformer coupled between the power supply and the conductive element;

a switching element configured to couple the power supply to one of the transformer and the conductive element; and a controller coupled to the switching element and programmed to receive at least one temperature from a temperature sensor of a steering wheel, and transmit instructions to the switching element based on the temperature.

14. The system of claim 13, wherein the controller is programmed to instruct the switching element to couple the power supply to the transformer in response to receiving a temperature from the temperature sensor being below a first threshold.

15. The system of claim 13, wherein the controller is programmed to instruct the switching element to couple the power supply to the conductive element in response to receiving a temperature from the temperature sensor being within a predefined temperature range.

16. The system of claim 13, wherein the controller is programmed to instruct the switching element to disconnect the power supply from the conductive element in response to the temperature from the temperature sensor being above a second threshold.

17. The system of claim 1, wherein the first wire is smaller than the second wire.

18. The system of claim 1, wherein a length of the second wire is less than a length of the first wire.

* * * * *